(12) United States Patent
Kruger et al.

(10) Patent No.: US 7,447,869 B2
(45) Date of Patent: Nov. 4, 2008

(54) METHOD AND APPARATUS FOR FRAGMENT PROCESSING IN A VIRTUAL MEMORY SYSTEM

(75) Inventors: W. Fritz Kruger, Sunnyvale, CA (US); Wade K Smith, Sunnyvale, CA (US); Robert A. Drebin, Palo Alto, CA (US)

(73) Assignee: ATI Technologies, Inc., Markham (CA)

( * ) Notice: Subject to any disclaimer, the term of this patent is extended or adjusted under 35 U.S.C. 154(b) by 270 days.

(21) Appl. No.: 11/102,210

(22) Filed: Apr. 7, 2005

(65) Prior Publication Data

US 2006/0230223 A1    Oct. 12, 2006

(51) Int. Cl.
*G06F 9/34*    (2006.01)

(52) U.S. Cl. .................. 711/205; 711/206; 711/207; 711/208

(58) Field of Classification Search .................. None
See application file for complete search history.

(56) References Cited

U.S. PATENT DOCUMENTS

| | | | |
|---|---|---|---|
| 6,189,074 B1 | 2/2001 | Pedneau | |
| 6,370,632 B1 * | 4/2002 | Kikuta et al. | 711/205 |
| 6,381,682 B2 * | 4/2002 | Noel et al. | 711/153 |
| 6,446,186 B1 * | 9/2002 | Priem et al. | 711/206 |
| 6,560,688 B1 | 5/2003 | Strongin et al. | |
| 2002/0169936 A1 | 11/2002 | Murphy | |
| 2004/0215918 A1 | 10/2004 | Jacobs et al. | |

\* cited by examiner

*Primary Examiner*—T Nguyen
(74) *Attorney, Agent, or Firm*—Courtney Staniford & Gregory LLP

(57) ABSTRACT

A method and apparatus for fragment processing in a virtual memory system are described. Embodiments of the invention include a coprocessor comprising a virtual memory system for accessing a physical memory. Page table logic and fragment processing logic scan a page table having a fixed, relatively small page size. The page table is broken into fragments made up of pages that are contiguous in physical address space and logical address space and have similar attributes. Fragments in logical address space begin on known boundaries such that the boundary indicates both a starting address of a fragment and the size of the fragment. Corresponding fragments in physical address space can begin anywhere, thus making the process transparent to physical memory. A fragment field in a page table entry conveys both fragment size and boundary information.

68 Claims, 7 Drawing Sheets

302

| 63 | 40 | 39 | | 12 | 11 | | 7 | 6 | 5 | 4 | 3 | 2 | 1 | 0 |
|---|---|---|---|---|---|---|---|---|---|---|---|---|---|---|
| Reserved | | Physical Page Addr | | | Fragment | | | W | R | P | | C | S | V |

| 63 | 40 39 | 12 11 | 7 | 6 | 5 | 4 | 3 | 2 | 1 | 0 |
|---|---|---|---|---|---|---|---|---|---|---|
| Reserved | Physical Page Addr | Fragment | W | R | P | | C | S | V |

FIG.3 (302)

| 31 | 12 11 | 1 | 0 |
|---|---|---|---|
| Physical base address | Reserved | | V |

FIG.9 (900)

METHOD AND APPARATUS FOR FRAGMENT PROCESSING IN A VIRTUAL MEMORY SYSTEM

TECHNICAL FIELD

The disclosed embodiments relate to virtual memory systems in computer systems.

BACKGROUND

The ever-increasing capability of computer systems drives a demand for increased memory size and speed. The physical size of memory cannot be unlimited, however, due to several constraints including cost and form factor. In order to achieve the best possible performance with a given amount of memory, systems and methods have been developed for managing available memory. One example of such a system or method is virtual addressing, which allows a computer program to behave as though the computer's memory was larger than the actual physical random access memory (RAM) available. Excess data is stored on hard disk and copied to RAM as required.

Virtual memory is usually much larger than physical memory, making it possible to run application programs for which the total code plus data size is greater than the amount of RAM available. This is known as "demand paged virtual memory". A page is copied from disk to RAM ("paged in") when an attempt is made to access it and it is not already present. This paging is performed automatically, typically by collaboration between the central processing unit (CPU), the memory management unit (MMU), and the operating system (OS) kernel. The application program is unaware of virtual memory; it just sees a large address space, only part of which corresponds to physical memory at any instant.

The virtual address space is divided into pages. Each virtual address output by the CPU is split into a (virtual) page number (the most significant bits) and an offset within the page (the N least significant bits). Each page thus contains $2^N$ bytes. The offset is left unchanged and the MMU maps the virtual page number to a physical page number. This is recombined with the offset to give a physical address that indicates a location in physical memory (RAM).

The performance of an application program depends dramatically on how its memory access pattern interacts with the paging scheme. If accesses exhibit a lot of locality of reference, i.e. each access tends to be close to previous accesses, the performance will be better than if accesses are randomly distributed over the program's address space, thus requiring more paging. In a multitasking system, physical memory may contain pages belonging to several programs. Without demand paging, an OS would need to allocate physical memory for the whole of every active program and its data, which would not be very efficient.

Current computer systems, even relatively small scale personal computer systems, include multiple subsystems and/or coprocessors working with the CPU and OS to perform specialized functions. For example, graphics coprocessors (or graphics processing units (GPUs)), floating point coprocessors, networking processors, and other types of coprocessors are required to process very large amounts of data with as much speed as possible and require large amounts of memory. A consistent set of rules necessarily governs access to the physical memory for all of the system elements or subsystems requiring such access. For example, the OS may dictate a page size and page table format to which each subsystem must interface for virtual memory accesses.

In general, the overall performance of a virtual memory/page table translation system is governed by the hit rate in the translation lookaside buffers (TLBs). A TLB is a table that lists the physical address page number associated with each virtual address page number. A TLB is typically used as a level 1 (L1) cache whose tags are based on virtual addresses. The virtual address is presented simultaneously to the TLB and to the cache so that cache access and the virtual-to-physical address translation can proceed in parallel (the translation is done "on the side"). If the requested address is not cached, the physical address is used to locate the data in memory that is outside of the cache. This is termed a cache "miss". If the address is cached, this is termed a cache "hit".

A page table in a virtual memory system is an array that contains an entry for each current virtual-to-physical address translation.

A page table entry (PTE) in the page table typically contains a physical page number and flag bits. Pages are of a uniform size and the smaller the page size, the less likely a reference to a particular page will result in a cache hit. Pages can also be combined into contiguous sections of memory known as fragments. A fragment is a contiguous series of physical pages. 100% fragmentation of memory implies one page per fragment. As average fragment size increases, or fragmentation decreases, the hit rate increases markedly.

It is desirable for virtual memory systems accessing a physical memory to employ techniques that increase hit rates. Challenges encountered in the design of such virtual memory systems include the constraints imposed by the memory architecture to which the virtual memory system must interface, including a fixed page size and a dictated page table entry format. It is also desirable for the techniques to result in minimum increased overhead, for example in terms of size and speed. It is desirable for the techniques to work within all of the constraints presented by a given memory architecture and to be transparent to memory clients accessing physical memory through the virtual memory system.

BRIEF DESCRIPTION OF THE FIGURES

FIG. 3 is a diagram of a page table entry (PTE), under an embodiment.

FIG. 9 is a block diagram of a page directory entry (PDE) format, under an embodiment.

DETAILED DESCRIPTION

Figure 1:
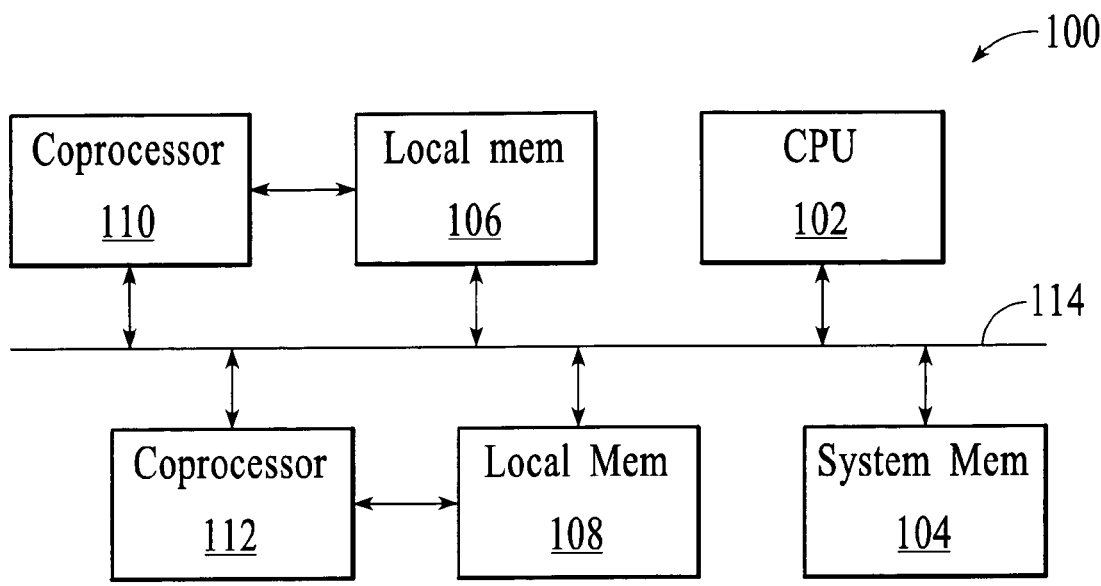
FIG. 1 is a block diagram of a computer system including a coprocessor, under an embodiment.

Embodiments of the invention include a coprocessor including a virtual memory system for accessing a physical memory. The coprocessor includes page table logic and fragment processing logic that scans a page table having a fixed, relatively small page size. The page table is broken into fragments made up of pages that are contiguous in physical address space and logical memory space and have similar attributes. Fragments in logical memory begin on known boundaries such that the boundary indicates both a starting address of a fragment and the size of the fragment. Corresponding fragments in physical address space can begin anywhere, thus making the process transparent to physical memory.

The page table logic and fragment processing logic writes page table entries to the page table, including a fragment field. In each page table entry (PTE), the fragment field supplies a directive to a page table unit about the size of the fragment in which the designated page lies. In one embodiment, the directive is a power of two such that a value of 0 indicates a fragment size of one page or 4 k-bytes, a value of 1 corresponds to a two-page or 8 k-byte fragment, a value of 2 means a four-page or 16 k-byte fragment and so on. Using the fragment field implies that physical pages are contiguous within this fragment, and that the logical start address of the fragment is aligned on the corresponding fragment size boundary. Thus, with a fragment value of 3, the fragment size is 32 k-bytes or eight pages, and this fragment begins on a 32 k-byte boundary in logical, but not necessarily physical, address space.

Embodiments of the invention effectively allow wildcarding in a cache, which facilitates greater efficiency in cache look-ups. While wildcarding in an associative cache is described herein, the invention is not so limited. Wildcarding as described herein can be extended to apply to direct-mapped caches and to N-Way associative caches.

Embodiments of the invention thus allow significantly fewer page table entries to be read even with a fixed, relatively small page size. When the physical address space can be allocated in a mostly contiguous pattern, the page table unit can use this a priori knowledge and significantly reduce the number of L1 TLB misses. For example, a value of twenty in the fragment field indicates that an entire 4 G-byte logical address space is physically contiguous and only one PTE need ever be read for the entire 4 G-byte space. Another advantage of the embodiments described is that one field in the PTE conveys both a starting location of a fragment and the fragment size, thus eliminating the requirement for separate size fields and start address fields.

Embodiments of the invention will be described with reference to a specific example of a system including a virtual memory system, a page table with specific a page size, and other details, but the invention is not so limited. In an example system used herein to illustrate embodiments of the invention, a virtual memory system is associated with a graphics processing unit (GPU) that interfaces with an operating system which dictates a page table configuration. However, embodiments as described are not limited to systems including a GPU, or to systems with the specific details described, but are applicable to any system in which a virtual memory system interfaces with a page table architecture.

FIG. 1 is a block diagram of a computer system 100 according to an embodiment. The system 100 includes a central processing unit (CPU) 102, and a system memory 104. In general the system memory 104 stores data that could be accessed by any component of the system 100. A coprocessor 110 and a coprocessor 112 communicate with the CPU 102 and the system memory over a bus 114. The bus 114 can be any type of bus used in computer systems, including a peripheral component interface (PCI) bus, an accelerated graphics port (AGP) bus, and a PCIE (PCI Express) bus. The processors 110 and 112 assist the main processor (CPU 102) by performing certain special functions, usually much faster than the main processor could perform them in software. In some cases coprocessors 110 and 112 decode instructions in parallel with the main processor and execute only those instructions intended for them. Either of coprocessors 110 and 112 may be, or may include, floating point coprocessors, graphics coprocessors (GPUs), networking coprocessors, and other types of coprocessors and processors.

The system 100 further includes local memory 106 and local memory 108. The local memory 106 is coupled to the coprocessor 110 and also coupled to the bus 114. The local memory 108 is coupled to the coprocessor 112 and also coupled to the bus 114. The local memories 106 and 108 are available to coprocessors 110 and 112 respectively in order to provide faster access to certain data that is frequently or recently used by the respective coprocessors than would be possible if the data were stored in the system memory 104.

Figure 2:
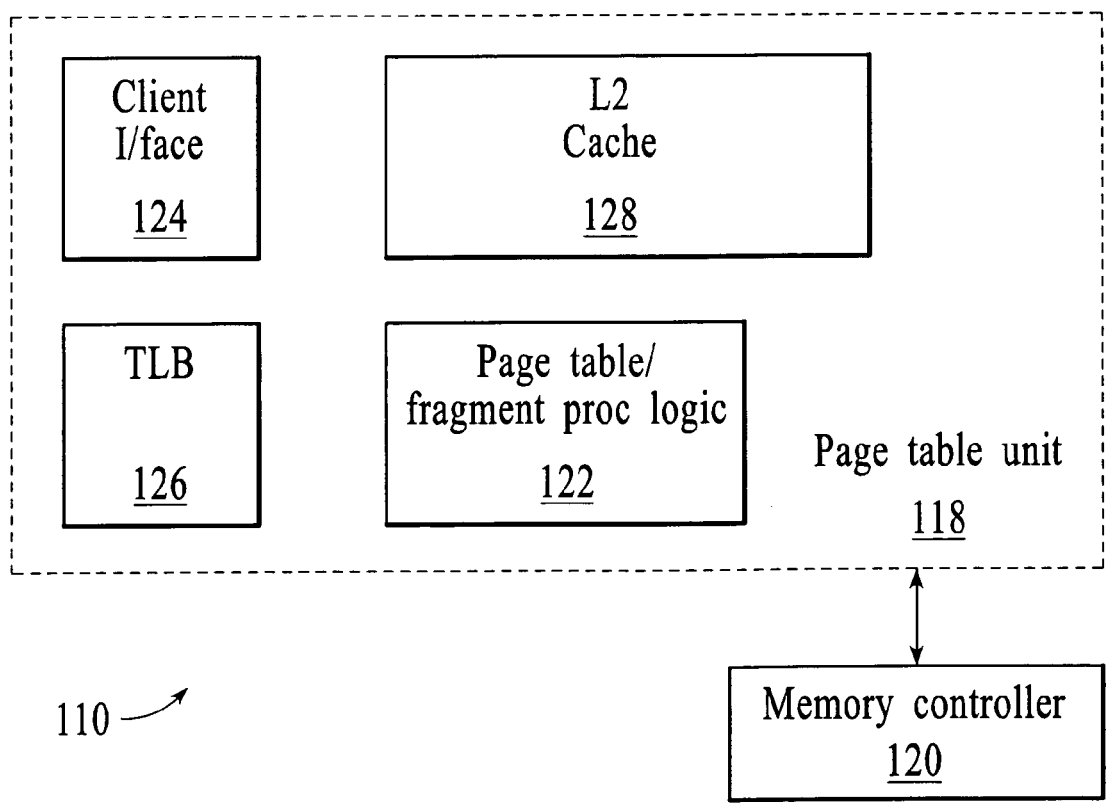
FIG. 2 is a block diagram of a coprocessor, under an embodiment.

FIG. 2 is a block diagram of one embodiment in which the coprocessor 110 includes a graphics processing unit (GPU) functionality. The coprocessor 110 includes a memory controller 120, and a page table unit 118. The page table unit 118 includes page table logic/fragment processing logic (PTL/FPL) 122, memory client interface 124, level 1 (L1) TLB 126 and level 2 (L2) cache 128. The TLB 126 functions both as a L1 cache and a translation lookaside buffer (TLB) for the L1 cache.

In one embodiment, the coprocessor 110 can receive requests for memory access from more than thirty memory clients that make read and write requests to the memory controller 120. Most of the memory clients are virtual clients that can run in a logical memory space. The client interface 124, the PTL/FPL 122, and the memory controller 120 facilitate access to data on behalf of these memory clients. Among other functions described below, the PTL/FPL 122 performs logical address to physical address translations and accesses a page table. In one embodiment, physical page tables exist in the local memory 106, and the registers specifying their locations utilize physical memory addresses. The architecture of the page table is dictated by an operating system of the CPU 102. Some of the memory clients may be only physical, in that they bypass the virtual memory logic entirely and can make requests directly to, and get data directly back from, the local memory 108.

The memory client interface 124 receives and responds to requests from memory clients. The TLB 126 and the L2 cache 128 store certain data and provide faster access to the data than if the data were stored elsewhere, as will be further explained below.

FIG. 3 is a diagram of page table entry (PTE) 302 according to an embodiment. In one embodiment, each page in the page table is 4 k-bytes in size. In the embodiment of FIG. 3, each PTE 302 is a 64-bit (8 byte) word. There is one PTE 302 for each 4k-byte logical page of addressable memory. This allows the page table logic to generate up to 40 bits of output given a 32-bit input address. The lower 40 bits the 64-bit PTE 302 are used for translation purposes.

The PTE 302 includes a 28 bit Physical Page Address field containing a physical 4 Kb-aligned base address of a mapped page. A V(alid) bit indicates whether the given PTE 302 contains a valid mapping. If a request is made to an invalid page, then a valid protection fault occurs. Depending upon how the page table control registers are programmed in various embodiments, this condition may cause writes to be dropped and may perform reads from default pages. Alternatively, the page table unit arranges to interrupt the host and possibly initiate a coprocessor context switch.

In embodiments described herein, a context implies a page table and the set of registers used to manipulate the page table. Each context has its own page table. There can be multiple, independent page tables active at one time. In one embodiment, flat page tables are implemented. In other embodiments, multi-level pages tables or some combination of multi-level and flat page tables are used. A page table is a mapping of virtual space to physical space. In various embodiments, there are up to eight different mappings. Each mapping can be managed independently of all the other mappings.

Context switching includes changing out one page table for another. This entails saving state for non-current contexts. Context switching avoids inefficient down-time when one page table is being modified. Clients that run together are grouped to make the context switching more efficient. In various embodiments, a context field (not shown) allows contexts to be specified on a per-memory-access-request basis. A S(ystem) bit indicates whether a page is located in local memory or system memory. This bit indicates when data must be read or written over the PCIE bus.

A C(ache) snooping bit indicates that read/write accesses to the page must be made using a snooped cycle. The cache snooping bit is useful when writing to memory pages, as it alerts processors on the bus that cached data may have to be invalidated.

Three access protection bits are available. A W(rite) bit indicates that the given page can be written. A R(ead) bit indicates that the given page can be read. A P(rivileged) bit indicates a page that can only be accessed when the context requesting access is operating in a privileged mode.

The fragment field provides directives to the page table unit 118 regarding the degree of fragmentation of the physical address space and allows for significant optimization of TLB 124 hit rates when fragmentation is low (that is, fragments are relatively large). The remaining bits of the PTE 302 are reserved, and in one embodiment, are set to 0.

In each PTE 302, the 5-bit fragment field supplies a directive to the page table unit 118 about the size of the fragment in which the designated page lies. The size of the fragment is a power of two such that a value of 0 indicates a fragment size of one page or 4 k-bytes, a value of 1 corresponds to a two-page or 8 k-byte fragment, a value of 2 indicates a four-page or 16 k-byte fragment, and so on. In general, the size of the logical or physical fragment size in bytes can be expressed as shown below.

$$\text{Logical/Physical fragment size in bytes} = 2^{(12+fragment)} \quad \text{Equation 1}$$

Using the fragment field implies that physical pages are contiguous within this fragment, and that the logical start address of the fragment is aligned on the corresponding fragment size boundary. Thus, with a fragment value of 3, the fragment size is 32 k-bytes or eight pages, and this fragment begins on a 32 k-byte boundary in logical, but not necessarily physical, address space. In one embodiment, each PTE 302 in the corresponding page range must be programmed with the same fragment value, as well as having the same W, R, P, S, C and V attributes. When the physical address space can be allocated in a mostly contiguous pattern, the page table unit 118 can use this a priori knowledge and significantly reduce the number of TLB 126 misses. In one embodiment with a 4 G-byte logical address space, a value of twenty in the fragment field implies that the entire 4 G-byte logical address space is physically contiguous and only one PTE 320 need ever be read.

In one embodiment, a host driver is responsible for constructing the fragment value in each PTE 302. If the host driver elects not to do any special fragment processing, then the fragment value is 0, and the physical memory is treated as fully fragmented in 4 k-byte pages from the viewpoint of the page table unit 118. When a PTE 302 containing a non-zero fragment size is fetched into the TLB 126, the tag representing that logical base address and the physical base address stored in the PTE 302 is adjusted as shown below to match the start of the designated fragment.

$$\text{PTE Physical Fragment} = \text{PTE Physical Page} - (\text{Logical Page} \,\&\, (2^{fragment-size} - 1)) \quad \text{Equation 2}$$

$$\text{Logical Fragment} = \text{Logical Page} \,\&\, \sim(2^{fragment-size} - 1) \quad \text{Equation 3}$$

Tag comparators also take the fragment size into account when looking for matches in the TLB 126. The comparison treats the lower fragment bits of the tag address field as 0 when looking for per-entry matches.

When computing the physical address of a page given its logical address within a fragment, the following computation applies.

$$\text{Physical Page} = \text{PTE Physical Fragment} + (\text{Logical Page} \,\&\, (2^{fragment-size} - 1)) \quad \text{Equation 4}$$

Figure 4A:
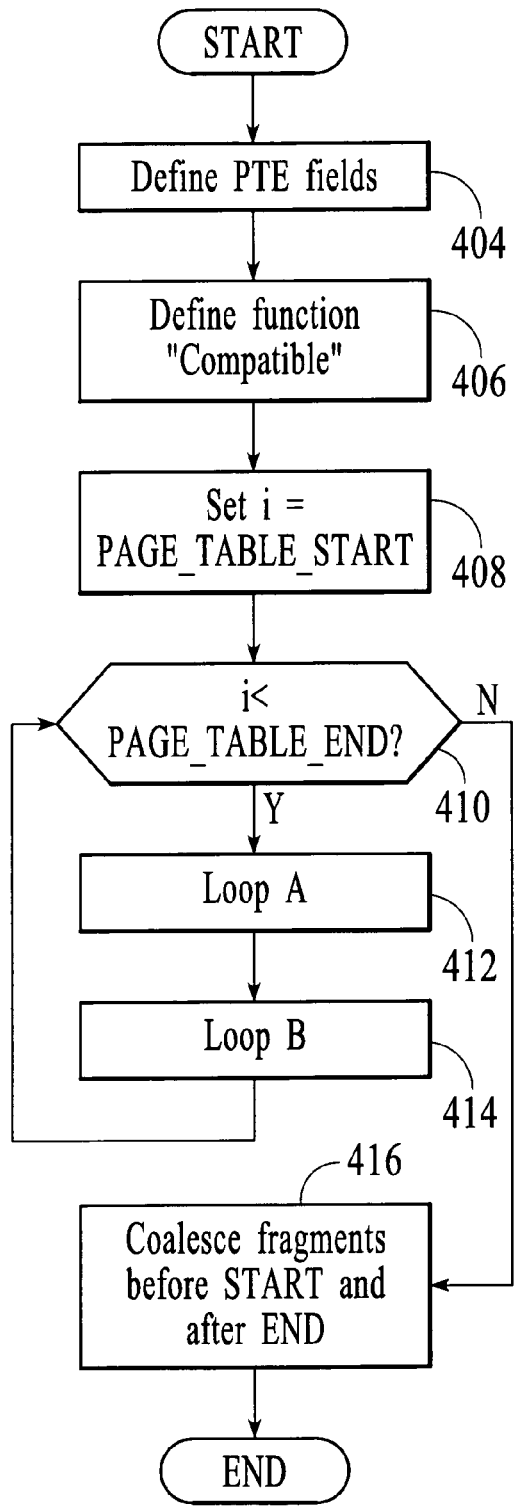
FIGS. 4A, 4B, and 4C form a flow diagram of a page table scanning algorithm for use in determining fragmentation of a page table, and for writing page table entries, under an embodiment.
Figure 4B:
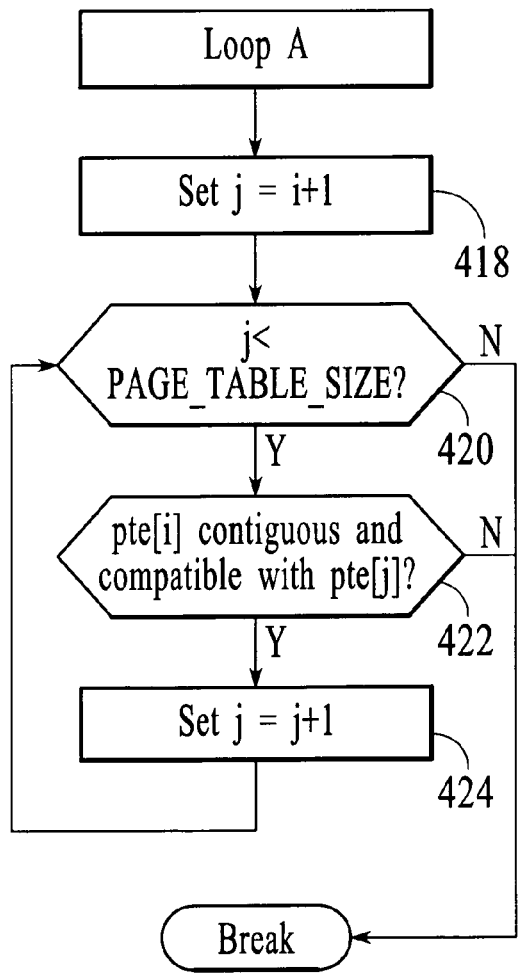
Figure 4C:
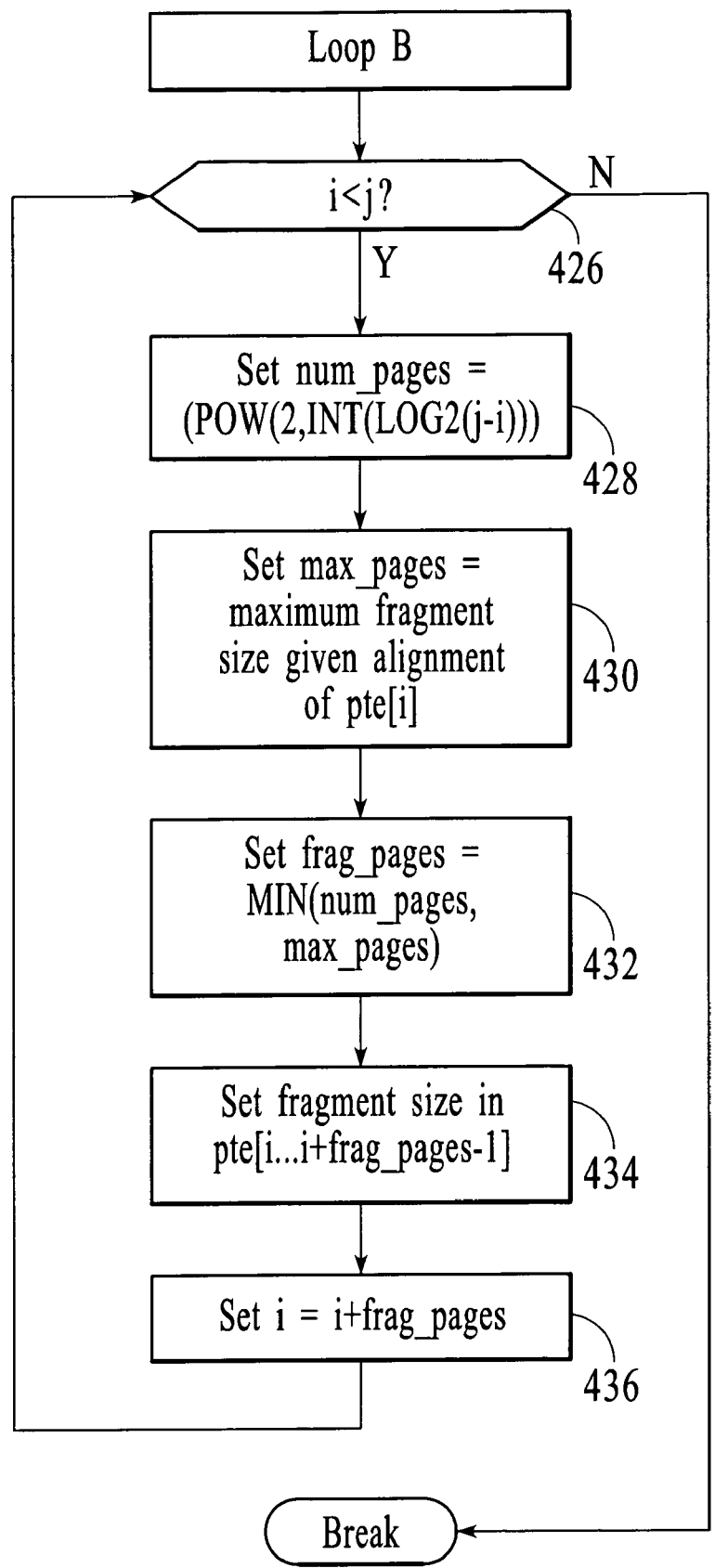

In one embodiment, the PTL/FPL 122 calculates the fragment values in a page table after physical page allocation by the CPU. FIGS. 4A, 4B, and 4C are flow diagrams illustrating a process of determining fragmentation of the page table and calculating fragment values to be written to PTEs. As described in more detail below, the process breaks memory up into aligned pieces, including finding the largest fragment that can be aligned on a boundary of a given size in logical memory space, and it updates the fragment size accordingly.

The process starts in FIG. 4A with defining PTE fields as shown at 404. This includes defining W, R, P, C, S, V, fragment, and base address fields as unsigned integers. Defining PTE fields further includes assigning a value (1 or 0) to indicate "true" for the W, R, P, C, S, and V fields. For the V field, "true" means the PTE contains a valid mapping. If a request is made to an invalid page, then a valid protection fault occurs. Depending upon how page table control registers are programmed, this condition may cause writes to be dropped and reads to occur from default pages. Alternatively, the page table unit 118 can arrange to interrupt the host and possibly initiate a GPU context switch.

For the S field, "true" indicates that a page is located in system memory rather than local memory. When the PCIE GART is disabled and page tables are enabled, the S bit indicates when data must be read or written over the PCIE bus. For the C field, "true" indicates that read/write accesses to this page must be made using a snooped cycle. This bit is useful, for example, when writing to system memory pages, as it alerts other processors on the bus that cached data may have to be invalidated. For the P field, "true" indicates a page that can only be accessed when the page table unit 118 is operating in privileged mode. For the R field, "true" indicates that the page can be read. For the W field, "true" indicates that the page can be written.

Defining PTE fields further includes defining the fragment field as a 5-bit field, and the base address field as a 28-bit field. Two reserved fields are defined as having sizes of 1-bit and 24-bits, respectively.

At 406, a function called "Compatible" is defined. This function is used to compare pages and determine whether pages have matching W, R, P, C, S, and V fields. For a set of pages to belong to a same fragment, they must be compatible, in that they have identical values in the indicated fields.

At 408 an index i is initialized to a value that indicates the start of the page table. At 410, it is determined whether the end of the page table has been reached by comparing i to a value that indicates the end of the page table. If the end of the page table has not been reached, loop A, which is illustrated in FIG. 4B, is executed.

Referring to FIG. 4B, the process labeled loop A is illustrated. Essentially, loop A builds up a list in physical address space by finding a range of indices that are all contiguous and all have the same properties. Then it will stop. It finds a contiguous region that is also compatible (all attributes are the same). Loop A begin at 418 by setting an index j equal to i+1. At 420, it is determined whether j is less than the page table size. If j is less than the page table size, page table entry pte[i] is compared with page table entry pte[j] to determine whether the two page table entries are both compatible and contiguous. If pte[i] and pte[j] are both compatible and contiguous, then j is incremented by setting j=j+1, and the process returns to 420 to determine whether j is less than the size of the page table. If pte[i] and pte[j] are not both compatible and contiguous, the process breaks.

As long as j is less than the size of the page table, and contiguous and compatible PTEs continue to be found, the process continues to assemble a contiguous, compatible range of pages. If j is not less than the page table size, the process breaks. Referring again to FIG. 4A, when the loop A process of FIG. 4B breaks, loop B is executed as shown in FIG. 4C.

The process of FIG. 4C breaks the contiguous, compatible range of pages into aligned sections. That is, groups of contiguous, compatible pages are aligned to start on power-of-two boundaries, and to contain a power-of-two number of pages. For example, if the fragment size is two, it is a four page (16 k-bytes) fragment. That means in logical address space, it is aligned on a 16 k-byte boundary. This allows the coprocessor to know where to look for the start of the current fragment by knowing only the fragment size. However, in physical address space, there is no restriction on where a page or fragment can start. In physical address space, the only restriction is that fragments must be contiguous, as they are in logical space.

The process of FIG. 4C begins by determining whether i is less than j at 426. If i is less than j, a variable num_pages is set to POW(2,INT(LOGO-i))) at 428. Then, at 430, a variable max_pages is set to the maximum fragment size given the alignment of pte[i]. A fragment may contain up to but not more than the number of pages indicated by the power-of-two boundary. For example, a 16 k-byte boundary can start a fragment with one, two, or four contiguous, compatible pages.

At 432, a variable called frag_pages is set to MIN(num_pages, max_pages). Then, at 434, the fragment size is set to pte[i . . . i+frag_pages−1]. At 436, i is set to i+frag_pages. The process of 428 through 436 continues until i is not less than j, at which time the process breaks.

To summarize loop B, loop B finds out what kind of boundary it is currently on and tries to find a fragment of the size. For example if it on an 8 k-byte boundary (implying two pages), it tries to find at most two pages in the current fragment. If it does find the two pages, it assigns them to the same fragment with a fragment size of one ($2^1$) in this case. It updates the fragment size by writing out the fragments as it goes.

If there are more pages to go in this fragment, then it loops back again, and it will bump up to the next boundary. For example, if the last boundary was an 8 k boundary, the next one is a 16 k boundary.

The process of loop B tries to find the largest boundary it was on last time. For example, having been on an 8 k boundary, it knew it was not on a 16 k boundary; so if it was able to fill that 8 k fragment, it knows next time it is going to be on a 16 k boundary.

Then it tries to look for four consecutive pages. The process does this in rotation; that is it looks for 16 k, then 32 k, etc. The process continues to try to build up larger and larger fragments. When the process nears the end it will eventually encounter fragments that are too large, meaning there is not enough left to fill them. The available pages are then broken up into $2^n$ size chunks and placed on like-sized boundaries. A chunk larger than the boundary size it is on will not be created. But even at this latter stage of the process, pages can still be coalesced at some intermediate boundary.

There may be instances in which, for example loop B was able to fill the two-page fragment, but only three contiguous pages can be found in the next loop. The process then breaks the section into pieces, places the two page (8 k) fragment on the 16 k boundary, and comes back around and places the loner (4 k) page at the next 8 k boundary. Performance of the system is improved even with these small fragments. Performance of the system can be dramatically improved with larger fragments.

Referring again to FIG. 4A, when loop B breaks, the process returns to 410 to determine whether i is less than page_table_end. If i is not less than page_table_end, at 416 remaining fragments are coalesced, Specifically, fragments before the start of the FIG. 4A process and after the end of the FIG. 4A process are coalesced.

In an alternative embodiment, the memory is allocated in fixed power-of-two sized chunks on same-sized boundaries in logical space. In this case, fragment sizes are assigned at allocation time, and do not have to be recomputed. However, if portions of the same-sized chunks are deallocated, a process such as that described with reference to FIGS. 4A, 4B, and 4C can compute fragments again. It is possible to limit the memory space in which the process is executed to those portions of the memory space that have been changed.

In one embodiment, a coprocessor is notified of updates to the page table. The coprocessor also has last access to the page table when it is allocated or changed, and the coprocessor actually writes the page table out. In various embodiments, the foregoing actions can be performed by any coprocessor, any processor, or by any driver.

Figure 5:
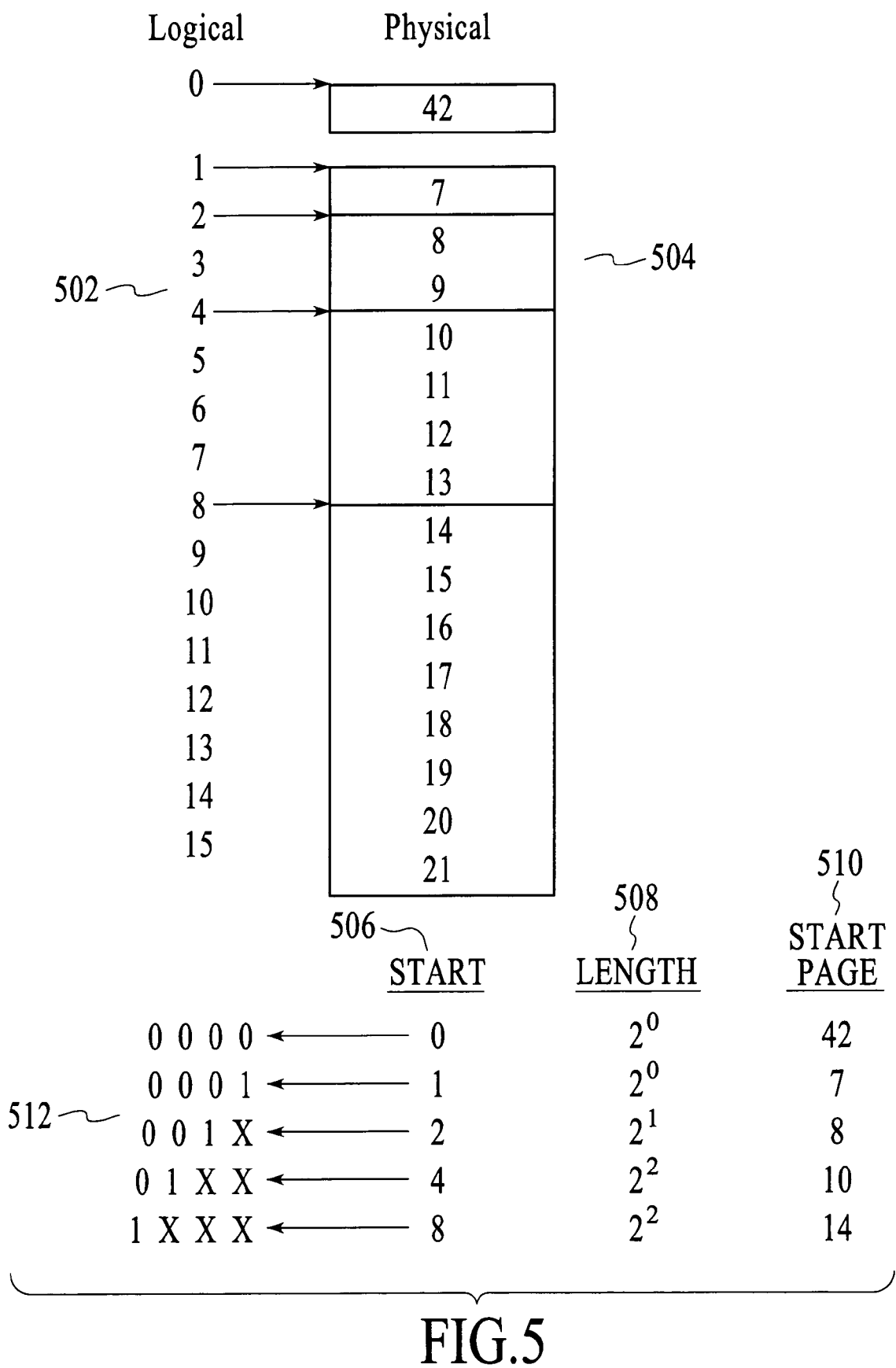
FIG. 5 is a block diagram illustrating an arrangement of memory addresses after application of the algorithm of FIG. 4, under an embodiment.

FIG. 5 is a diagram that illustrates an arrangement of memory addresses after the process of FIGS. 4A, 4B and 4C. A physical memory map 504 is shown in the right of the diagram. Memory map 504 is broken into fragments of contiguous, compatible pages. As previously explained, there are no restrictions on where (at what physical addresses) fragments may start in physical memory. The physical memory addresses are indicated in the memory locations as shown. For example, address 42 at the top of the diagram indicates a one-page fragment with a starting address of 42. Below address 42 is a one-page fragment with a starting address of 7. Below address 7 is a two-page fragment with a starting address of 8, and so on.

On the left of the diagram, corresponding logical addresses 502 are shown. Referring to the bottom of FIG. 5, a summary indicates logical fragment start addresses 506, corresponding fragment lengths 508, and corresponding physical fragment start page addresses 510.

The logical address boundary 0 implies a fragment of length up to $2^m$ pages, where m=int($\log_2$ memory size). As shown, this corresponds to a physical page that starts at 42. The next fragment starts at logical address 1 and has a length of $2^0$ pages, or one page, and corresponds to a physical fragment starting at 7. As explained, a fragment at a $2^n$ boundary may have a length in pages of up to, but not more than $2^n$. The next fragment begins at logical address 2 and has a length of $2^1$ pages, or two pages, and corresponds to a physical fragment starting at 8. The next fragment begins at logical address 4 and has a length of $2^2$ pages, or four pages, and corresponds to a physical fragment starting at 10. The next fragment begins at logical address 8 and has a length of $2^3$ pages, or eight pages, and corresponds to a physical fragment starting at 14.

Column 512 shows the number of least significant bits that can be ignored during a lookup given the various starting logical addresses. Bits marked "X" are "don't cares". This illustrates how wildcarding becomes possible when fragment are aligned so that fragment boundaries convey both the starting address of the fragment and the size of the fragment.

An alternative to using aligned fragments is using ideal fragments, which can start on any boundary. To use ideal fragments, an additional field in the PTE is used to indicate a starting address. There are tradeoffs, including area and speed, between using aligned fragments and ideal fragments. With ideal fragments, the starting address field might have to be the same size as the physical address field, or one can envision it being an offset from the logical page represented by the PTE. But this field would have to grow larger as the maximum fragment size increased. The size of the field could be restricted, but if a fragment of any size can start on any boundary, then the starting address field has to be the same size as the physical page address.

Fewer bits for the starting address field can be used if the fragment size is restricted. The field can then be used as an offset from whatever physical address is pointed to by the PTE. This may impose its own restrictions because limiting the fragment size may limit or eliminate certain configurations.

One factor affecting the decision to use aligned fragments or ideal fragments is the degree of expected fragmentation. 0% fragmentation implies one fragment for the entire memory space, while 100% fragmentation implies one page per fragment. The speedup (or increase in hit rate) realized as a function of fragmentation reduction is a linear function with ideal fragments. The speedup realized as a function of fragmentation reduction is a log function with aligned fragments.

Figure 7:
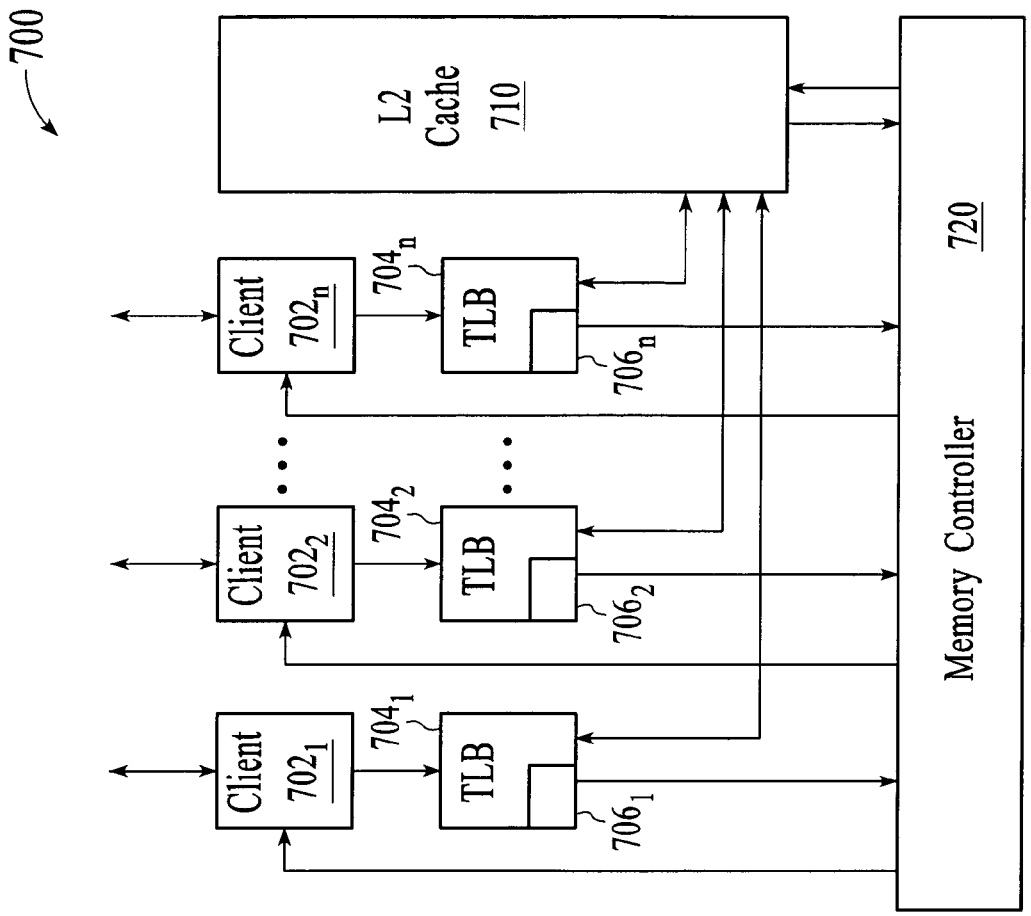
FIG. 7 is a block diagram of elements of a coprocessor, including multiple memory channels, under an embodiment.
Figure 6:
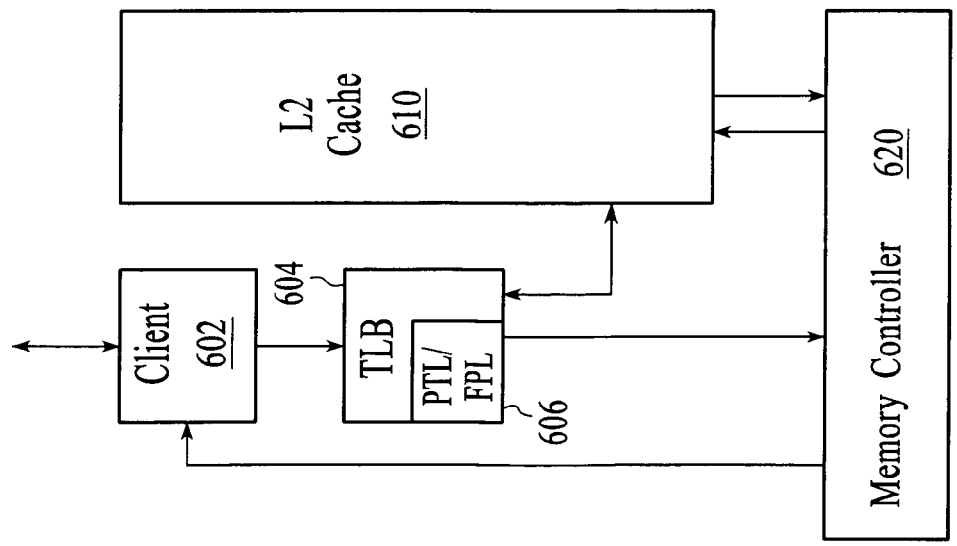
FIG. 6 is a block diagram of elements of a coprocessor, including one memory channel, under an embodiment.
Figure 8:
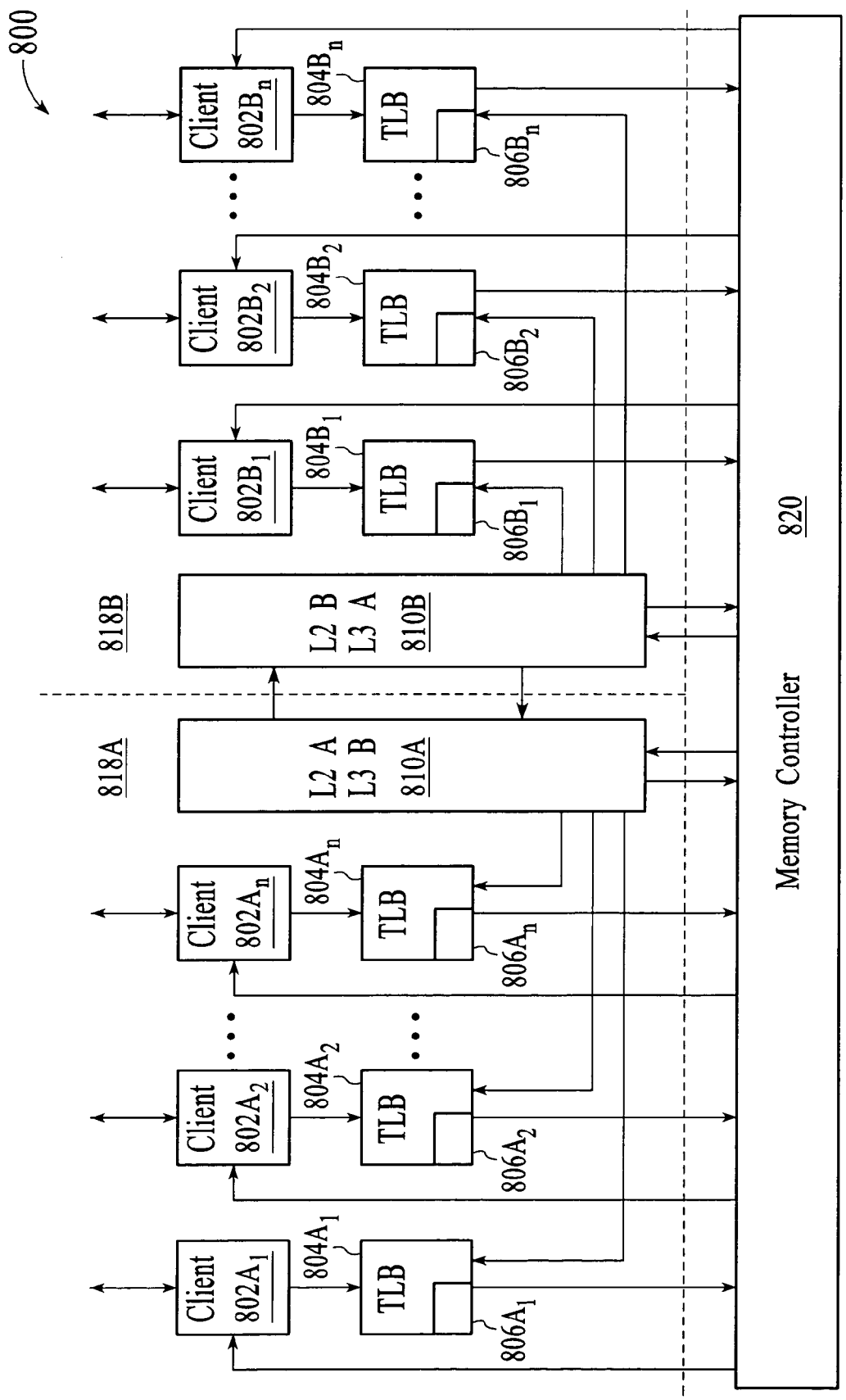
FIG. 8 is a block diagram of elements of a coprocessor, including two page table units, under an embodiment.

FIG. 6 through FIG. 8 are block diagrams that further illustrate embodiments of coprocessors that implement the method as described above and illustrated in FIGS. 4A through 4C. FIG. 6 is block diagram of elements 600 of an embodiment of a coprocessor that is generally similar to the coprocessor 110. Elements 600 are elements of one memory channel. Among other things, the memory channel performs translations of logical addresses seen by memory clients into physical addresses seen by a memory controller. A client interface or "client" 602 is an interface between a single memory client and a memory controller 620. A memory client can be any application requiring access to physical memory. For example, a texture unit of a GPU is a memory client that makes only read requests. Clients that are exterior to the coprocessor of FIG. 6 may also access memory via the client interface 602, including any other processes running on any hosts that communicate via a common bus with the coprocessor of FIG. 6.

The client interface 602 allows the client to make requests through a dedicated L1 TLB, TLB 604. Usually, the TLB 604 performs operations on the request, such as an address translation, either locally based on information stored in the TLB 604 or, in the case of a TLB miss, through an L2 cache 610. The TLB 604 includes page table logic/fragment processing logic (PTL/FPL) 606. The PTL/FPL 606 keeps track of the size of the fragment in which a logical page exists. The PTL/FPL 606 can perform a comparison over a much larger range, limited only by the size of that fragment, than just e.g., eight single-page entries.

A memory controller 620 of the coprocessor includes an interface to the TLB 604. The L2 cache 610 has its own interface to the memory controller 620. The L2 cache 610 makes physical accesses to memory and does not require virtual memory or address translation.

The memory controller 620 and the client interface 602 communicate through a direct route, as shown. This route is used, for example, when returning data to the client. It is also used for acknowledgements for writes, or actual data for reads. Such returning data does not have to go through the TLB 604.

The TLB 604 performs a L1 cache lookup on an address associated with an input/output (I/O) request received from its client. If the translation can be performed based on data already present in the TLB 604, then the associated I/O request is forwarded to the memory controller 620 with a physical address in place of the previous logical address. If the translation cannot be performed, a separate request to update the TLB 604 is forwarded to the L2 cache 610. If the requested data is already present in the L2 cache 610, it will be transferred to the requesting TLB 604 where the translation process will proceed as before. If the requested data is not present, the L2 cache 610 must retrieve a portion of the memory-resident page table from local memory (not shown) via its own interface to the memory controller 620. Various levels of latency may exist in the TLB 604 and L2 cache 610 depending on the ultimate location of the requested mapping data. Therefore, embodiments also include several latency compensation data structures in which to temporarily store request data while the translation data returns out of order.

In one embodiment, the client interface 602, the TLB 604, and the L2 cache 610 are components of a page table unit, but the invention is not so limited.

FIG. 7 is a block diagram of elements 700 of another embodiment of a coprocessor. In the embodiment shown, multiple memory channels provide memory access for multiple clients. Client interfaces $702_1$, and client interfaces $702_2$ through $702_n$ include more than thirty client interfaces. Each client interfaces 702 is an interface from a single client to a memory controller 720. Each of the client interfaces 702 communicates with a dedicated TLB 704. TLBs $704_1$ through $704_n$ are shown. Each of TLBs 704 includes a PTL/FPL 706. PTL/FPLs $706_1$ through $706_n$ are shown. Each TLB 704 is connected to the memory controller 720.

Each TLB 706 is further connected to the L2 cache 710 for processing TLB misses. The L2 cache 710 has its own interface to the memory controller 720. The L2 cache 710 makes physical accesses to memory and does not require virtual memory or address translation.

The memory controller 720 and the client interfaces 702 communicate through a direct route, as shown. This route is used, for example, when returning data to the client. It is also used for acknowledgements for writes, or actual data for reads. Such returning data does not have to go through the TLB 704

FIG. 8 is a block diagram of elements 800 of an embodiment of a coprocessor in which two page table units are used, thus duplicating the L2 cache functionality. This embodiment and its elements will be described in detail with reference to FIG. 8. A page table unit 818A and a page table unit 818B include similar elements and communicate with each other through respective L2 caches 810A and 810B.

Each page table unit handles roughly one-half of the memory clients. Extensive performance modeling of various page table unit configurations has shown significant performance enhancement when each L2 cache 810 can access the other L2 cache 810 as an effective L3 cache. This can be done with a minimal number of wires, and thus is an efficient design.

A function of each page table unit 818 is to perform logical to physical address translations on behalf of memory clients making requests to the memory controller. This translation is based on page table data located in local memory. The translation is page-based with a fixed page size of 4K (4,096) bytes. It supports a logical address space of up to 4G (4,294,967,296) bytes or 1M (1,048,576) pages. Each page is represented as a 64-bit page table entry (PTE) in the physical page table. In on embodiment, forty bits are used for actual address generation. Accordingly, in one embodiment the supported physical address space range can span 1T (1,099,511,627,776) bytes using sparse allocation. As previously described, each PTE contains a 28-bit page base address, a valid bit, system bit, cache snooping bit, read, write and privileged access bits, and a 5-bit fragment size field. All other bits are reserved.

The page table units 818 support up to eight active physical page table contexts simultaneously. A first page table context 0 is reserved for the so-called system context. The remainder can be assigned at will, but in one embodiment various clients each have their own independently managed page table contexts. Types of clients include for example, video, multimedia, and 3D graphics clients. In one embodiment, multimedia clients use a context that is independent from the 3D graphics client context.

The page table unit 818A includes client interfaces $802A_1$, and $802A_2$ through $802A_n$. The client interfaces 802A receive memory access requests from respective memory clients and communicate the requests to respective TLBs $804A_1$ through $804A_n$. The TLBs 804A each access a memory controller 820. Each of TLBs $804A_1$ through $804A_n$ includes a respective one of PTL/FPLs $806A_1$ through $806A_n$.

The page table unit 818A further includes the L2 cache 810A, which has its own interface to the memory controller 820. As will be explained further below, the L2 cache 810A serves as a L2 cache for the TLBs 804A, and as a L3 cache for the TLBs 804B of the page table unit 818B.

The page table unit 818B includes client interfaces $802B_1$, and $802B_2$ through $802B_n$. The client interfaces 802B receive memory access requests from respective memory clients and communicate the requests to respective TLBs $804B_1$ through $804B_n$. The TLBs 804B access the memory controller 820. Each of TLBs $804B_1$ through $804B_n$ includes a respective one of PTL/FPLs $806B_1$ through $806B_n$.

The page table unit 818B further includes the L2 cache 810B, which has its own interface to the memory controller 820. As will be explained further below, the L2 cache 810B serves as a L2 cache for the TLBs 804B, and as a L3 cache for the TLBs 804A of the page table unit 818A.

In one embodiment, each TLB 804 (in page table units 818A and 818B) is a relatively small fully associative cache that does very fast address translations. Various sizes of TLB 804 can be used, for example to accommodate the performance requirements of various clients. In one embodiment, two sizes of TLB 804 are used for different classes of clients, a relatively larger TLB 804 for relatively higher-performance clients, and a relatively smaller TLB 804 for relatively lower-performance clients. The two sizes are assigned to different classes of clients as appropriate. Because the PTL/FPL 806 keeps track of the size of fragment in which a logical page exists, it can actually perform a comparison over a much larger range, limited only by the size of that fragment, than just the number of entries in the TLB 804. A comparison can thus be performed over a much larger search space.

If page table mode is not enabled, incoming requests from memory clients are forwarded directly to the memory controller 820 with no additional latency. When page table mode is enabled, a per-request translate signal along with a context field determines how any lookups are performed. If translation is on, the per-request context field selects the associated page table context. If translation is off, the address is first checked against an aperture range, and if it is within that range, the address will be looked up using system context 0. If outside that range, the address may be treated as physical, or even ignored depending upon register settings.

As the first step in the actual address lookup process, addresses associated with requests from memory clients are checked against the entries in the TLB 804. If the address already matches one of the entries from the TLB 804, the requesting address is transformed from logical to physical address space and the request is forwarded to the memory controller 820. For reads, a tag associated with each request allows the originating memory client to identify returning data independent of the change in logical to physical addresses. Similarly, for writes an index field allows for write notification.

If the address cannot be translated by the TLB 804, then the upper twenty bits of the page address and the page table context field (from the client) are passed to the L2 cache 810. Significant latency may occur here, so the data associated with the request (including any write data) is saved in a latency compensation queue according to a hit-under-miss scheme. In various embodiments a miss-under-miss scheme is also implemented for latency compensation. An index that identifies the queued entry is also passed to the L2 cache 810 so that returning data can be associated with the original request. In one embodiment, the return data is a 28-bit physical page address, a 5-bit fragment field, one system bit, one snooping bit, and one fault bit along with the original request index. If a fault occurred during translation in the L2 cache 810, the TLB 804 client will drop writes or substitute reads from a default page. When no fault occurs, the new PTE data replaces one of those already in the TLB 804, and processing continues as described for the initial hit case.

Each L1 TLB latency compensation queue entry contains the following data: a context field; a memory address; an endian mode field; a size field (read clients only); a tag field (read clients only); an index/tag tag field (write clients only); a mask field (write clients only); and a write data field (write clients only).

Fragment size checking is handled by the PTL/FPLs 806. This involves matching addresses based on the contents of the fragment field in addition to the designated tag data. This provides the advantage of a potentially dramatic decrease in miss rates. In general, the control flow in response to a memory request follows this sequence:

if page tables disabled, submit request with assumed physical address to memory controller (MC) (done);
if translation disabled and logical address outside system aperture, either treat as physical or ignore by dropping writes or submitting default reads (done);
if translation disabled and inside system aperture, use system context 0 in place of context selected at interface;
if translation enabled, use context specified at memory client interface;
check logical address to see if it matches tag from TLB using page and fragment processing;

if matching tag found, compute physical address and submit request to MC (done);

otherwise, save request data and pass context, page address, request ID to L2 for fetching PTE;

on PTE return and no fault, store in TLB after adjusting fragment base addresses;

if fault occurred, drop writes or substitute read from default page (done);

otherwise, pass returned physical address and submit request to MC (done).

In various embodiments, there are multiple read memory clients and multiple write memory clients, not all of which require page table interfaces. For example, in one embodiment, there are more than 20 read memory clients and more than ten write memory clients. As previously discussed, there are various classes of clients and various TLB sizes. The relatively larger TLBs have larger latency compensation structures than do the relatively smaller TLBs. Client assignments to page table units can be designed to reflect the physical layout of the chip, and the relative numbers of client classes between the two units may become somewhat unbalanced as a result. In some cases, dummy clients are inserted to keep the numbers of each class of client the same for each of page table units 818A and 818B.

A function of the L2 caches 810 and associated logic is to receive secondary requests for PTEs from the multiple TLBs 804. In addition, each L2 cache 810 also act as a non-faulting L3 cache for the other page table unit's L2 cache. This means that, in the case of an L3 miss, it will not attempt to fill the request via its interface to the memory controller. In one embodiment, each L2 cache 810 has the following specifications:

32-byte (256-bit) cache line size;

128 cache lines (4 k-bytes or 32K-bits);

each cache line holds four page table entries (512 page table entries can be stored in each L2 cache at any given time);

4-way set associative;

LRU replacement; and 27-bit tag (physical memory address of cache line).

If page table mode is not enabled, the L2 caches 810 will have no work to do, as no requests will reach them from the TLBs 804. Otherwise, an L2 cache 810 logic processes requests from one TLB 804 per cycle. Each request includes the twenty most significant bits (MSBs) of the page request, 3-bit page table context and a 4-bit request ID. Assuming a flat page table model and given the page address, page table select bit, and page table registers, the L2 cache 810 logic computes the physical memory address of the cache line containing the desired PTE. It first checks to see if the cache line is already in the L2 cache 810. If the desired cache line is present, fault processing and detection takes place in the L2 cache 810 before returning the associated PTE data back to the requesting TLB 804 client. The entire PTE is not returned in its original form, instead it is separated into 28-bit physical page address, 5-bit fragment field, one system bit, one cache snooping bit, and one fault bit. The requesting index is returned to the TLB 804 client along with the distilled PTE data.

If the cache line is not present, the L2 cache 810 makes a request to the other L2 cache 810 in the other page table unit as an L3 request using the 27-bit cache line address. In this case, the result (hit or miss) comes back in a fixed number of cycles along with 256 bits of cache line data. If there is an L3 hit, the cache line data will replace an already existing cache line and request processing continues as before.

If the L3 misses, then the L2 cache 810 logic issues a 256-bit memory controller read request via its own memory controller interface. This request looks like a memory read request from any other memory read client. As the read request may entail significant latency, the L2 cache 810 logic has its own latency compensation queue for storing read request data while waiting for the read data to return. An 8-bit index describing the queue store location is submitted along with the read request for later identification. Once the data returns, it replaces an already existing cache line and request processing continues as before.

In an alternative embodiment to the one shown in FIG. 8, the two page table units 810 actually share a common interface to the memory controller 820. This has the effect of dividing the available index address space by two. Thus, each page table unit is able to manage up to 128 outstanding read requests to the MC before stalling. In one embodiment, each entry contains the following data:

5-bit memory client L1 ID;

27-bit cache line address;

20-bit logical address;

3-bit context; and 4-bit L1 request index.

In a flat page table model, the entire page table is laid out linearly in memory. Given a page table base address in physical memory, and a starting mapping address and ending mapping address in logical memory, the page table unit 810 computes the physical address corresponding to a logical PTE. The page table base address must be on 4 Kb (4,096 byte) boundary, but the starting and ending mapping addresses must be on 2 Mb (2,097,152) boundaries and specify an inclusive range. All mappings are considered invalid if the upper eleven bits of the last mapping address is arithmetically less than those of the first mapping address. The PTE address can be expressed as shown in Equation 5.

$$\text{PTE address} = \{\text{BASE\_ADDR}[31:12], 12'b0\} + (\{\text{LOG\_ADDR}[31:12], 12'b0\} - \{\text{START\_ADDR}[31:21], 21'b0\}) >> 9 \qquad \text{Equation 5}$$

In general, the flow of control in response to a TLB 804 request follows this sequence in a flat page table model:

Given context and page address plus page table description, compute address of PTE cache line in physical memory;

If cache line already present in L2 Cache, extract PTE, perform fault processing and return data to requesting L1 TLB (done);

Otherwise, pass cache line address to L3 Cache and check for hit/miss after fixed number of cycles;

If L3 hit, retrieve L3 cache line data, store in L2, extract PTE, process faults and return to requesting L1 TLB (done);

Otherwise, save request data and issue read request for cache line to MC;

When MC read data returns, store in L2, extract PTE, process faults and return to requesting L1 TLB (done).

One embodiment of the coprocessor supports multi-level page tables. Any special processing associated with multi-level page tables is performed by L2 cache 810 logic. The L2 cache 810 logic computes the address of the PDE from a page directory and goes through the same type of read request processing as for the L1 TLB request. Once the PDE is present in the L2 Cache, the L2 logic computes the cache line address of the PTE from the page table.

Although the embodiments shown include a cache hierarchy including L1, L2 and L3 caches, other embodiments feature cache hierarchies with additional levels, including L4 caches, L5 caches, and so on.

The multi-level page table model offers a level of indirection in order to support more flexibility in the physical layout of the page table. Instead of a base address that points to a linearly contiguous page table in physical memory, this model has a pointer to a special page known as a page directory. This page directory contains 1024 page directory entries (PDEs), each of which points to a $2^{nd}$ level 4 k-byte page table. Each $2^{nd}$ level 4 k-byte page table contains 512 64-bit PTEs. FIG. 9 is an illustration of a format of a PDE 900 according to an embodiment.

The second level page tables may be allocated discontiguously, or may even be left out if a given range of addresses is not to be used.

The twenty most significant bits of the PDE 900 contain the physical base address of the second level page table. Unused entries are marked with a V(alid) bit of 0 meaning that all addresses within that corresponding range are invalid. References to pages in these invalid ranges cause valid protection faults which can be handled as described with reference to the PTE above.

The PDEs cache very well, and, in general, the multi-level page table model operates at only a slight performance penalty relative to using the flat page table model.

There may be up to two memory request cycles when fulfilling requests from a multi-level page table. Performance modeling has shown this event to be relatively rare, however. The multi-level page table case follows the general flow:

Given context and page address plus page table registers, compute address of PDE cache line in physical memory;
If cache line already present in L2 Cache, extract page table address from PDE and continue using flat page table flow (done);
Otherwise, pass cache line address to L3 Cache and check for hit/miss after fixed number of cycles;
If L3 hit, retrieve L3 cache line data, store in L2, extract page table address from PDE and continue using flat page table flow (done);
Otherwise, save request data and issue read request for cache line to MC;
When MC read data returns, store in L2, extract page table address from PDE and continue using flat page table flow (done).

A full set of performance counters is available for monitoring the efficiency of each page table unit. In general the monitoring capabilities include:

Per L1 TLB:
number of requests
number of page hits
L2 Cache
number of L2 requests
number of L2 hits
number of Page Directory requests
number of Page Directory hits
number of outgoing L3 requests
number of outgoing L3 hits
number of incoming L3 requests
number of incoming L3 hits
Page Table
number of requested Surface Probes
number of failing Surface Probes
number of passing Surface Probes
number of ignored Surface Probes All counting stops in each individual functional unit when one of its counters saturates.

Interfaces to the page table as described herein include a translate field and a context field. The translate field instructs the page table unit to perform logical to physical address translations using a context selected by the context field. If the translate signal is deasserted, this instructs the page table unit to treat the provided address as physical if outside a provided aperture or, if inside the aperture, to look up the address in the special system context 0.

Each page table unit supports multiple page table contexts. Each client can be programmed such that values in the context field select from the available page table contexts. The value in the context field can be statically overridden via per-client register programmable bit fields.

Aspects of the invention described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices and standard cell-based devices, as well as application specific integrated circuits (ASICs) and fully custom integrated circuits. Some other possibilities for implementing aspects of the invention include: microcontrollers with memory (such as electronically erasable programmable read only memory (EEPROM)), embedded microprocessors, firmware, software, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other processing systems and systems, not only for the computer system and coprocessor system described above.

The elements and acts of the various embodiments described above can be combined to provide further embodiments. These and other changes can be made to the invention in light of the above detailed description.

In general, in the following claims, the terms used should not be construed to limit the fragment processing method and system to the specific embodiments disclosed in the specification and the claims, but should be construed to include any processing systems that operate under the claims to provide fragment processing. Accordingly, the fragment processing method and system is not limited by the disclosure, but instead the scope of the fragment processing method and system is to be determined entirely by the claims.

While certain aspects of the method and apparatus for fragment processing are presented below in certain claim forms, the inventors contemplate the various aspects of the method and apparatus for fragment processing in any number of claim forms. For example, while only one aspect of the method and apparatus for fragment processing may be recited as embodied in computer-readable medium, other aspects may likewise be embodied in computer-readable medium. Accordingly, the inventors reserve the right to add additional claims after filing the application to pursue such additional claim forms for other aspects of the method and apparatus for fragment processing.

What we claim is:

1. A method for creating a data structure for use in memory address translation, the method comprising:
   identifying fragments that comprise one or more pages in logical address space and physical address space, wherein physical address space is allocated in fixed-size pages;
   generating a data structure comprising multiple entries, wherein each entry contains information that is used to perform a variable number of logical to physical address translations, including information regarding the identified fragments; and
   setting at least part of the data structure to indicate that a host driver elects not to identify fragments, wherein the physical address space is treated as fully fragmented in the fixed-size pages for purposes of page table accesses.

2. The method of claim 1, wherein the information includes a size of an identified fragment.

3. The method of claim 1, wherein identified fragments in logical address space begin on an aligned address boundary, and wherein the aligned address boundary is implied by the information.

4. The method of claim 3, wherein the aligned address boundary is a power-of-two boundary.

5. The method of claim 1, wherein identifying further comprises:
   defining page table entry (PTE) fields, comprising a fragment field that indicates a size of a fragment;
   defining compatible pages, wherein compatible pages in logical address space and physical address space have the same values;
   finding contiguous and compatible groups of pages in a page table; and
   aligning the contiguous and compatible groups of pages into contiguous and compatible fragments that each begin on a type of address boundary in logical address space, wherein the address boundary has a relationship to a size in pages of a fragment.

6. The method of claim 5, wherein a fragment in physical address space begins on any type of address boundary.

7. The method of claim 5, wherein the type of address boundary is a power-of-two boundary such that the boundary in logical address space is related to $(2^{value\ of\ the\ fragment\ field}) \times (\text{page size})$.

8. The method of claim 7, wherein a number of pages in a fragment is $2^{(value\ of\ the\ fragment\ field)}$.

9. The method of claim 1, further comprising processing a memory access request from a memory client, including:
   performing a tag comparison in a translation lookaside buffer (TLB), comprising taking a fragment size as indicated in the information into account so as to search an area of one or more pages;
   fetching a page table entry (PTE) into the TLB; and
   adjusting a tag representing a logical base address and a physical base address stored in the PTE to match the start of a designated fragment.

10. The method of claim 1, further comprising processing a memory access request from a memory client, including:
    attempting to perform an address translation including performing a tag comparison in a translation lookaside buffer (TLB), including taking a fragment size as indicated in the information into account so as to search an larger area than one page; and
    if an address cannot be translated by the TLB, passing data from the request to a level 2 cache.

11. The method of claim 10, wherein the level 2 cache employs a hit-under-miss scheme including temporarily storing request data in a latency compensation queue while address translation data returns out of order, and passing an index to the level 2 cache, wherein the index is used to associate the returning translation with the request.

12. A system comprising:
    a central processing unit coupled to a bus;
    at least one memory device coupled to the bus, wherein the at least one memory device is accessible via demand paging, and wherein each memory page has a fixed size;
    a coprocessor coupled to the bus, the coprocessor further comprising,
       at least one memory controller for controlling access to the at least one memory device for a plurality of memory clients; and
       at least one page table unit for handling communication between the plurality of memory clients and the memory controller, wherein the at least one page table unit implements demand paging, including breaking logical address space and physical address space into contiguous and compatible fragments, wherein the contiguous and compatible fragments include a number of pages, wherein the at least one page table unit further comprises,
          at least one client interface, wherein each client interface receives memory requests from one memory client;
          at least one level 1 translation lookaside buffer (TLB) comprising page table logic/fragment processing logic (PTL/FPL), wherein a TLB is coupled to one or more client interfaces, and wherein the PTL/FPL is configured to break the logical address space and the physical address space into contiguous and compatible fragments by,
             scanning a page table to determine contiguous and compatible fragments in logical address space and physical address space, wherein compatibility implies that similar attributes of different pages have the same values; and
             generating a page table entry (PTE) that includes a fragment field; and
          a context field, wherein the context field is used to select one of a plurality of page table contexts to use for address translation.

13. The system of claim 12, wherein a size of a fragment in pages is related to a starting address of the fragment.

14. The system of claim 12, wherein the fragment field indicates a size of the fragment.

15. The system of claim 12, wherein the fragment field indicates that the physical memory pages are contiguous within the fragment and that a logical start address of the fragment is aligned on a corresponding fragment size boundary.

16. The system of claim 15, wherein the corresponding fragment size boundary is a power-of-two boundary.

17. The system of claim 12, wherein the at least one page table unit further comprises at least one memory controller interface, wherein a memory controller interface is coupled to each TLB to receive translated addresses, and further coupled to each memory client to return memory data.

18. The system of claim 12, wherein the at least one page table unit further comprises at least one level 2 (L2) cache, wherein each L2 cache is coupled to a plurality of TLBs for receiving memory request data in the case of TLB misses.

19. The system of claim 18, wherein the at least one page table unit further comprises a memory controller interface coupled to the L2 cache.

20. The system of claim 18, comprising two page table units, wherein a number of memory clients are divided between the two page table units, and wherein each of the page table units includes an L2 cache.

21. The system of claim 20, wherein each L2 cache performs as a level 3 (L3) cache for the other L2 cache, wherein an L3 cache is searched in the case of an L2 miss.

22. The system of claim 21, further comprising a plurality of additional levels of caches including at least a level 4 (L4) cache and a level 5 (L5) cache.

23. The system of claim 21, wherein each L2 cache includes a latency compensation queue for storing read request data while waiting for read data to return, wherein an index describing a queue store location is submitted along with the read request for later identification, and wherein when the read data returns, the read data replaces an already existing cache line and request processing resumes.

24. The system of claim 18, wherein the two L2 caches are coupled to a common memory controller interface.

25. The system of claim 18, wherein the memory clients comprise more than twenty read memory clients and more than ten write memory clients, not all of which require communication with the page table unit.

26. The system of claim 25, wherein the memory clients further comprise a plurality of classes of memory clients recognized by the page table units, wherein different classes of memory clients are associated with different sizes of TLBs.

27. The system of claim 26, wherein classes of memory clients with relatively higher performance requirements are associated with TLBs that have relatively more entries, and classes of memory clients with relatively lower performance requirements are associated with TLBs that have relatively fewer entries.

28. The system of claim 27, wherein the page table unit is configured to operate with a multi-level page table structure, including extracting a page table address from a page directory entry (PDE) to determine a page table to use.

29. The system of claim 12, wherein the PTL/FPL is further configured to match addresses based on contents of the fragment field in addition to designated tag data, thus increasing search space beyond the fixed page size.

30. The system of claim 12, wherein the at least one page table unit is configured to operate with a flat page table structure.

31. The system of claim 12, wherein each memory client can select from a plurality of available page table contexts using the context field.

32. A computer readable medium storing instructions that, when executed, cause memory requests in a computer system to be processed, wherein processing comprises:
    scanning a page table to identify fragments comprising contiguous pages in logical address space and physical address space, wherein physical address space is allocated in fixed-size pages;
    generating a page table entry (PTE) that includes a fragment field indicating that physical memory pages are contiguous within the fragment, wherein the PTE is used in performing logical to physical address translations; and
    processing a memory access request from a memory client, including,
        performing a tag comparison in a translation lookaside buffer (TLB), comprising taking a fragment size as indicated in the fragment field into account so as to search an area of one or more pages;
        fetching a PTE into the TLB; and
        adjusting a tag representing a logical base address and a physical base address stored in the PTE to match the start of a designated fragment.

33. The computer readable medium of claim 32, wherein the fragment field further indicates a size of the fragment.

34. The computer readable medium of claim 33, wherein scanning further comprises:
    defining PTE fields;
    defining compatible pages, wherein compatible pages in logical address space and physical address space have like values;
    finding contiguous and compatible groups of pages; and
    aligning the contiguous and compatible groups of pages into contiguous and compatible fragments that each begin on a type of address boundary in logical address space, wherein the address boundary has a relationship to a size in pages of a fragment.

35. The computer readable medium of claim 34, wherein a fragment in physical address space begins on any type of address boundary.

36. The computer readable medium of claim 34, wherein the type of address boundary is a power-of-two boundary such that the boundary in logical address space is related to $2^{(value\ of\ the\ fragment\ field)} \times (page\ size)$.

37. The computer readable medium of claim 36, wherein a number of pages in a fragment is $2^{(value\ of\ the\ fragment\ field)}$.

38. The computer readable medium of claim 32, wherein the fragment in logical address space begins on an aligned address boundary, and wherein the aligned address boundary is implied by the fragment field.

39. The computer readable medium of claim 38, wherein the aligned address boundary is a power-of-two boundary.

40. The computer readable medium of claim 32, further comprising processing a memory access request from a memory client, including:
    attempting to perform an address translation including performing a tag comparison in a translation lookaside buffer (TLB), comprising taking a fragment size as indicated in the fragment field into account so as to search an area larger than one page; and
    if an address cannot be translated by the TLB, passing data from the request to a level 2 cache.

41. The computer readable medium of claim 40, wherein the level 2 cache employs a hit-under-miss scheme including temporarily storing request data in a latency compensation queue while address translation data returns out of order, and passing an index to the level 2 cache, wherein the index is used to associate the returning translation with the request.

42. A computer readable medium storing instructions that, when executed, cause memory requests in a computer system to be processed, wherein processing comprises:

scanning a page table to identify fragments comprising contiguous pages in logical address space and physical address space, wherein physical address space is allocated in fixed-size pages;

generating a page table entry (PTE) that includes a fragment field indicating that physical memory pages are contiguous within the fragment, wherein the PTE is used in performing logical to physical address translations; and setting the fragment field value to 0 when a host driver elects not to identify fragments, wherein the physical address space is treated as fully fragmented in the fixed-size pages for purposes of page table accesses.

43. A coprocessing means for performing a specialized function in an electronic system, comprising:

means for controlling access to a memory device for a plurality of memory clients; and means for handling communication between the plurality of memory clients and the means for controlling access to at least one memory device, wherein the means for handling communication implements demand paging, including breaking logical address space and physical address space into contiguous and compatible fragments, wherein the contiguous and compatible fragments include a number of pages, wherein the means for handling communication comprises a page table unit means, and wherein the page table unit means comprises, a client interface means, wherein the client interface means receives memory requests from a memory client; and a level 1 translation lookaside buffer (TLB) comprising page table logic/fragment processing logic means (PTL/FPL means), wherein the TLB is coupled to the client interface means, and wherein the PTL/FPL means is configured to break the logical address space and the physical address space into contiguous and compatible fragments including, scanning a page table to determine contiguous and compatible fragments in logical address space and physical address space, wherein compatibility implies that similar attributes of different pages have similar values;

generating a page table entry (PTE) that includes a fragment field indicating that physical memory pages are contiguous within the fragment; and wherein the page table unit means further comprises a context field, wherein the context field is used to select one of a plurality of page table contexts to use for address translation.

44. The coprocessing means of claim 43, wherein a size of a fragment in pages is related to a starting address of the fragment in logical address space.

45. The coprocessing means of claim 43, wherein a fragment field in the PTE provides information regarding a starting address and a size of the fragment.

46. The coprocessing means of claim 43, wherein the fragment may begin on any type of address boundary.

47. The coprocessing means of claim 43, wherein the fragment field further indicates that a logical start address of the fragment is aligned on a corresponding fragment size boundary.

48. The coprocessing means of claim 43, wherein the page table unit means further comprises a memory controller interface means coupled to the TLB to receive translated addresses, and further coupled to the memory client to return memory data.

49. The coprocessing means of claim 43, wherein the page table unit means further comprises a level 2 (L2) cache, wherein the L2 cache is coupled to the TLB for receiving memory request data in the case of TLB misses.

50. The coprocessing means of claim 49, wherein the page table unit means further comprises a memory controller interface means coupled to the L2 cache.

51. The coprocessing means of claim 49, comprising a plurality of page table unit means, wherein a plurality of memory clients are divided among the plurality of page table unit means, and wherein each of the page table unit means includes a L2 cache.

52. The coprocessing means of claim 51, wherein each L2 cache performs as a level 3 (L3) cache for another L2 cache, wherein an L3 cache is searched in the case of an L2 miss.

53. The coprocessing means of claim 52, wherein each L2 cache includes a latency compensation queue for storing read request data while waiting for read data to return, wherein an index field describing a queue store location is submitted along with the read request for later identification, wherein when the read data returns, the read data replaces an already existing cache line and request processing resumes.

54. The coprocessing means of claim 51, wherein the plurality of L2 caches are coupled to a common memory controller interface means.

55. The coprocessing means of claim 51, wherein the plurality of memory clients comprise more than twenty read memory clients and more than ten write memory clients, not all of which require communication with the page table unit means.

56. The coprocessing means of claim 55, wherein the plurality of memory clients further comprise classes of memory clients with relatively higher performance requirements and classes of memory clients with relatively low performance requirements.

57. The coprocessing means of claim 56, wherein the classes of memory clients with relatively higher performance requirements are associated with relatively larger TLBs, and classes of memory clients with relatively low performance requirements are associated with relatively smaller TLBs.

58. The coprocessing means of claim 57, wherein the page table unit means is configured to operate with a multi-level page table structure, including extracting a page table address from a page directory entry (PDE) to determine a page table to use.

59. The coprocessing means of claim 43, wherein the PTL/FPL means is further configured to match addresses based on contents of the fragment field in addition to designated tag data, thus increasing search space beyond the fixed page size.

60. The coprocessing means of claim 43, wherein the page table unit means is configured to operate with a flat page table structure.

61. The coprocessing means of claim 43, wherein the page table unit means supports a plurality of page table contexts, and wherein a memory client can select from available page table contexts of the plurality of page table contexts using the context field.

62. A method for creating a data structure for use in memory address translation, the method comprising:

identifying fragments that comprise one or more pages in logical address space and physical address space, wherein physical address space is allocated in fixed-size pages;

generating a data structure comprising multiple entries, wherein each entry contains information that is used to perform a variable number of logical to physical address translations, including information regarding the identified fragments;

performing a tag comparison in a translation lookaside buffer (TLB), comprising taking a fragment size as indicated in the information into account so as to search an area of one or more pages;

fetching a page table entry (PTE) into the TLB; and adjusting a tag representing a logical base address and a physical base address stored in the PTE to match the start of a designated fragment.

63. A method for creating a data structure for use in memory address translation, the method comprising:

identifying fragments that comprise one or more pages in logical address space and physical address space, wherein physical address space is allocated in fixed-size pages;

generating a data structure comprising multiple entries, wherein each entry contains information that is used to perform a variable number of logical to physical address translations, including information regarding the identified fragments;

attempting to perform an address translation including performing a tag comparison in a translation lookaside buffer (TLB), including taking a fragment size as indicated in the information into account so as to search an larger area than one page; and if an address cannot be translated by the TLB, passing data from the request to a level 2 cache, wherein the level 2 cache employs a hit-under-miss scheme including temporarily storing request data in a latency compensation queue while address translation data returns out of order, and passing an index to the level 2 cache, wherein the index is used to associate the returning translation with the request.

64. A method for creating a data structure for use in memory address translation, the method comprising:

identifying fragments that comprise one or more pages in logical address space and physical address space, wherein physical address space is allocated in fixed-size pages; and generating a data structure comprising multiple entries, wherein each entry contains information that is used to perform a variable number of logical to physical address translations, wherein the information comprises a fragment field whose value indicates a starting address and a size of a fragment, wherein the data structure is configurable to indicate that fragments will not be identified, wherein the physical address space is treated as fully fragmented in the fixed-size pages for purposes of page table accesses.

65. The method of claim 64, wherein the fragment in logical address space begins on an aligned address boundary, and wherein the aligned address boundary is implied by the information.

66. The method of claim 65, wherein the aligned address boundary is a power-of-two boundary.

67. The method of claim 64, wherein determining further comprises:

finding contiguous and compatible groups of pages in a page table; and aligning the contiguous and compatible groups of pages into contiguous and compatible fragments that each begin on a type of address boundary in logical address space, wherein the address boundary has a relationship to a size in pages of a fragment.

68. The method of claim 67, wherein a fragment in physical address space begins on any type of address boundary.

* * * * *